United States Patent Office 2,938,893
Patented May 31, 1960

2,938,893
ALKALI BARK DERIVATIVE

Kenneth Russell Gray and John Charles Steinberg, Shelton, Wash., and Hartzell Lance Crosby, Westport, Conn., assignors to Rayonier Incorporated, Shelton, Wash., a corporation of Delaware No Drawing. Filed Dec. 28, 1955, Ser. No. 555,789

7 Claims. (Cl. 260—124)

This invention relates to the digestion of bark to derive therefrom water-soluble alkali metal thio-derivatives of the bark. The new products of the invention are obtained by digesting the coniferous barks, in a suitable state of subdivision, with an aqueous solution of sodium or potassium sulfide or with a mixture of sodium or potassium sulfide and sodium or potassium hydroxide, or mixtures of these sulfides and hydroxides, at a suitably elevated temperature to convert part of the water-insoluble portion of the bark to a water-soluble alkali metal derivative. Such digestion results in the recovery of a relatively high percentage of chemicals from the bark consisting of soluble polymeric aromatic hydroxyl materials in the form of alkali metal thio-derivatives of the bark.

The coniferous barks which we have found to have properties which make them effective in carrying out the process of our invention and in producing our improved chemical products are the following: Western hemlock (Tsuga heterophylla), Douglas fir (Pseudotsuga menziessi), Western white fir (Abies concolor, Abies grandis and Abies amabilis), Sitka spruce (Picea sitchensis), Eastern hemlock (Tsuga canadensis), Southern yellow pines (Pinus echinata), (Pinus taeda), (Pinus elliottii), and (Pinus rigida var. serotina), and Redwood (Sequoia sempervirens). The invention is not only concerned with the treatment of these barks individually, but with blends or mixtures of these barks. Sitka spruce yields the largest percentage of chemicals while Redwood yields the least.

Barks of the aforementioned trees are considered to contain three classes of phenolic material of high phenolic hydroxyl content and relatively low methoxyl content. One of these classes is phlobatannins which are considered to be water-soluble polymers of catechins or other polyhydroxy aromatic material. The second and third classes consist of water-insoluble polyhydroxy aromatic materials which resemble the phlobatannins but which probably have a higher molecular weight. Such water-insoluble polyhydroxy aromatic materials are herein termed phlobaphenes and phenolic acids. The barks also will contain an aromatic polymer high in methoxyl but relatively low in phenolic hydroxy content, resembling wood lignin. In practicing the invention using low amounts of the aforementioned chemicals (not exceeding 0.10 lb. of said chemicals expressed as $Na_2O$ per lb. bone dry bark), very little of this highly-methoxylated material (bark "lignin") will be extracted. As the amount of chemical is increased above 0.10, there will be extracted in substantial and increasing amounts, the highly-methoxylated aromatic material, together with the highly phenolic-low methoxyl material described above. Even in such case, however, the extracted alkali metal thio-derivative of bark will be substantially aromatic and phenolic in character.

The bark also contains varying proportions of waxes depending on the species, the waxes of Douglas fir being in relatively large amounts. If, for example, the bark is extracted with an organic solvent to remove and recover the waxes present, the extracted bark residue may be advantageously used in preparing the bark derivatives of the invention.

As used in this specification, "phenolic hydroxyl group" refers to any hydroxyl group attached to an aromatic ring irrespective of the nature of any bond or bonds between said aromatic ring and other cycloaliphatic, aliphatic or aromatic groups. Thus, for example, in the formula of the typical catechin below, which is considered to be an unpolymerized precursor of tannins and phlobaphenes, there are four phenolic hydroxyls and one aliphatic or alcoholic hydroxyl, the latter being on the cycloaliphatic ring.

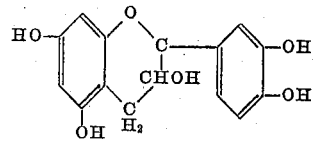

As used herein, the term "phenolic material" refers to any compound or mixture of compounds containing phenolic hydroxyl groups, i.e. aromatic hydroxyl groups. Wherein a specific compound is referred to by the word "phenol" (i.e. reference simply to "phenol" rather than to "a phenol") this refers to monohydroxybenzene.

The new products are obtained by the digestion of the bark with sodium sulfide, potassium sulfide and mixtures of either or both of these with sodium and/or potassium hydroxide. The optimum results will usually be obtained where the $Na_2O$ equivalent content is substantially 100% sodium or potassium sulfide. Considerable of the technical advantage, however, is retained when the alkali metal hydroxide is substituted for part of the alkali metal sulfide. Moreover, use of such mixtures reduces the cost of the chemical raw materials and thus enhances the economics of the process. The alkali metal sulfide content must, however, represent at least 5% of the total $Na_2O$ to give to the alkali metal thio derivative of bark its distinctive and unusual properties as illustrated in the examples hereinafter described.

In order to simplify the general discussion of the invention the sodium or potassium sulfides and mixtures thereof with hydroxides will be referred to as "alkali sulfide."

The reaction of the barks with the alkali sulfide must be carried out under critically controlled conditions to solubilize selectively only the desired portion which is high in aromatic hydroxyl groups, and to leave unsolubilized unwanted polymeric non-phenolic material. The introduction of the organic sulfur in the polyphenolic bark material extracted does not merely change the chemical analysis but results in an important stabilizing action so that the bark derivatives of the invention and resinous compositions prepared from them are less subject to undergoing unwanted polymerization and viscosity rise on storing in solution than are bark extracts prepared by other means (e.g. by NaOH or water extraction). In accordance with our invention the coniferous bark is digested in a water solution of alkali sulfide at a temperature of from about 65° C. to 175° C. until a part of the water-insoluble portion of the bark is converted to a water-soluble alkali derivative thereof, and the alkali metal of the sulfide, and the alkali metal of the hydroxide when used, equivalent to about 0.03 to 0.20 part $Na_2O$ per part of dry bark and at least part of the sulfur of the sulfide, are combined with bark substance, and the resulting water-soluble alkali bark derivative is separated from the bark residue. The sulfides hydrolyse in solution and the digestion liquor contains sodium hydroxide even when none is added. The concentration of alkali sulfide in the water solution is preferably about 0.1 to 6.7% of alkali sulfide.

Consistency, expressed as percent, is defined as the parts of bone-dry bark per 100 parts of reaction mixture. In practicing the invention, the consistency may vary from 3 to 25%, the preferred range being about 10-20%.

The useful range of extraction time is about 15 minutes to 150 minutes at maximum temperature. Under practical operating conditions, times of less than 20 minutes do not afford good yields, while little yield is gained by prolonging the reaction over 120 minutes and some degradation of the bark derivative occurs. In general, the higher the temperature and/or concentration the less time is required, and vice versa.

The alkali bark derivatives of the invention are water-soluble polymeric hydroxy aromatic compounds in the form of their alkali metal thio-derivatives. The products of the invention can be used in place of simple phenols for many purposes. One outstanding use for the derivatives is as a substitute for phenol in forming phenol-formaldehyde adhesive resins. However, since there is considerable variation in the bark derivative depending on the composition of the extraction solutions, the severity of extraction conditions, and the kind of bark extracted, due consideration should be given to these variables when preparing a bark derivative to be used as a substitute for phenols as in the preparation of phenol-formaldehyde adhesive resins. The alkali metal thio derivatives of bark are equal or superior to tannins as deflocculants, and are especially effective drilling mud additives. Moreover, they are effective as drilling mud additives when prepared under the various conditions herein described. When the solutions are converted to a dry state the bark derivatives are stable and do not change materially over long periods of time, and when in solution, have a relatively low rate of polymerization.

Bark from the trees is usually obtained in large pieces which are preferably reduced in size to pass screens of about 2 to about 20 meshes to the inch in order to avoid an excessive amount of void space in the charge and to permit penetration of the alkali solution. As an operating expedient it is desirable to avoid an excessive amount of fines, such as bark dust which sometimes clogs the filters, although such fines may be in a state of subdivision conducive to rapid penetration and digestion.

Satisfactory bark derivatives of the type produced in accordance with this invention are obtained by heating the bark with an aqueous alkali sulfide-containing solution at a temperature of from 65° C. to 175° C., having present the ratio of alkali sulfide to bark of from 0.03 to 0.20 part of sulfide, expressed as $Na_2O$ equivalent, per part of oven dry bark in the reaction mixture. The concentration of alkali sulfide in the solution used may vary from about 0.1% to 6.7% ($Na_2O$ equivalent) which is equivalent to bark consistencies (i.e. percent bark in slurries) of about 3% to 25% and in the preferred cases from about 10-20%. In these preferred cases the total water present in the reaction mixture permits sufficient fluidity so that the reaction mixture may be readily agitated and brought uniformly to reaction temperature during the reaction period. Uniform mixing of the chemical and the reaction mass may thus be achieved and uniform temperatures readily attained and maintained. Under preferred conditions, a ratio of about 0.05 part of alkali sulfide expressed as $Na_2O$ per part of oven dry bark is used in the reaction mixture which has a consistency of about 10% to about 20% bark and in the optimum with an alkali sulfide solution concentration of about 1%. When it is desired to produce bark derivatives to be used as a substitute for phenols as in the preparation of phenol formaldehyde adhesives it is necessary to keep the total alkali sulfide to bark ratio below 0.1 (expressed as $Na_2O$) to avoid solubilizing low-phenolic bark components.

An excess of water over the amounts indicated tends to slow the reaction by undue dilution of the chemical, requires excessive space in the digesters and eventually gives a very dilute derivative solution requiring a correspondingly costly evaporation to recover the bark derivative as concentrated solutions or solids. In general, it is desirable, but not necessary, to agitate the charge in the digester although continuous mixing reduces somewhat the time of reaction. Depending upon the temperature of the reaction, the process may be conducted in an open vessel or in a closed vessel. Either open or closed extraction vessels may be used and the extraction may be conducted batchwise or continuously provided uniform temperatures and chemical distribution is obtained by suitable agitation, except, of course, that pressure vessels are required for treatments at temperatures above the boiling points of the reaction mixtures. The process is ideally suited to continuous operation, and such operation is preferred.

Following the digestion, the solubilized bark derivatives of the reaction as well as other water-soluble materials are separated. This can be accomplished by filtering on a vacuum filter, followed by washing, provided that thin filter cakes are maintained. This method, while economically practical, is not the most desirable since the reaction mass is of a somewhat gelatinous nature. Some of the soluble bark derivatives of reaction are contained in solution and some are occluded in the gelatinous material. In view of the high molecular weight of the bark derivative and its slow diffusion rate from the gelatinous material, the separation of the derivative by washing operations or other operations dependent on diffusion has disadvantages. Washing operations involve uneconomic dilution, and the recovery of bark derivative is not even relatively complete unless many changes of water and prolonged soaking periods to effect diffusion are provided.

Effective and rapid separation of substantially all soluble bark derivatives of the digestion is preferably accomplished by mechanical dislodging aids. Such mechanical dislodging aids or expressing means effectively separate occluded solution and the soluble reaction product contained therein from the bark residue. Expressing, as by compressing the mixture of watery material and bark residue in a continuous screw press or in a batch hydraulic press, is especially effective in that solutions of maximum concentration are producible. Using either continuous or batch pressing it will frequently be found desirable to reslurry the pressed residue in water and repress. In a typical case, pressing the cake to a final moisture content of 60% effected recovery of about 80-85% of the content of solubilized solid. Substantially complete recovery of the balance was obtained by diluting the press cake with water and pressing a second time. Advantageously the effluent from the second pressing containing the major portion of the remaining solubilized solids may be recycled to form the make-up solution in a subsequent digestion. In this manner the effluent from the first press is recovered at maximum solids content, thereby facilitating subsequent evaporation.

The filtrate from the presses may be subjected to a clarifying filtration or settling operation. It is then concentrated by evaporation. Concentration is most desirably effected by vacuum evaporation and most economically by using multiple effect vacuum equipment. Conveniently, solutions of about 25% to about 50% concentration are produced. Solutions of higher concentration than 50% have high viscosities and are difficult to handle.

If either concentrated or dilute solutions are subjected to a flash drying operation, the bark derivative may be converted to a stable solid or dry form without any detectable polymerization or other change in chemical properties. Such flash drying may be approximated in vacuum drum drying but is most advantageously accomplished in spray dryers. The latter have been found to be particularly desirable in producing a material having excellent physical properties and freedom from alteration by either degradation or polymerization. The dry bark derivative retains its solubility, reactivity and general chemical characteristics and may be stored practically indefinitely without loss or alteration of these properties.

The sodium sulfide solutions employed in the following examples were prepared from technical grade flake having the following specifications:

| | |
|---|---|
| $Na_2S$ | percent 60–62 |
| NaCl | percent max 1.5 |
| Other Na salt | percent max 2.0 |
| Fe | p.p.m. max 8 |
| Cu, Ni, Ca, Mn | p.p.m. max 1 |
| Water of crystallization | percent min 35 |

Concentrated stock solutions of the above chemical were filtered and analyzed for $Na_2S$ prior to use. The chemical additions were based on the $Na_2S$ analysis.

The sulfur-containing alkali bark derivatives of our invention were prepared as follows:

Bark was ground in a hammermill to a size that would pass through a screen of about two meshes to the inch and analyzed for moisture content. Aqueous sodium or potassium sulfide solution of the proper concentration, sufficient in quantity to form a mixture of 10 to 12 percent consistency with the foregoing ground bark, was then added to a steam-jacketed autoclave at a temperature of about 60° C., the autoclave agitator was turned on, the ground bark was added and the autoclave was sealed. The temperature was rapidly raised to the specified maximum temperatures and held there for the desired time. After digestion, the resulting reaction mixture was first drained on a 40 x 60 mesh screen and then, to further clarify the solution, it was filtered through a 325 mesh screen. The solution of alkali bark derivative was then concentrated under a vacuum of approximately 25 inches of mercury and spray dried. The product was a free-flowing, water-soluble, black powder which was largely insoluble on acidification.

Table I gives yield data for alkali bark derivatives obtained in the foregoing manner:

TABLE I

*Extraction of various bark species with sulfide-containing solutions*

| Ext. No. | Bark | Chemical | $Na_2O$: Bark Ratio | Temp., °C. | Time at Temp., Hr. | Yield, percent of B. D. bark | |
|---|---|---|---|---|---|---|---|
| | | | | | | Gross | Net |
| 1 | Western Hemlock | $Na_2S$ | 0.05 | 97 | 2 | 34.8 | 28.6 |
| 2 | do | $Na_2S$ | 0.05 | 150 | 2 | 44.8 | 38.5 |
| 3 | Douglas Fir | $Na_2S$ | 0.05 | 97 | 2 | 33.6 | 27.4 |
| 4 | do | $Na_2S$ | 0.05 | 150 | 2 | 47.6 | 41.3 |
| 5 | Amabilis Fir | $Na_2S$ | 0.05 | 97 | 2 | 31.6 | 25.4 |
| 6 | do | $Na_2S$ | 0.05 | 150 | 2 | 36.4 | 30.1 |
| 7 | Southern Pine [1] | $Na_2S$ | 0.05 | 97 | 2 | 29.7 | 23.4 |
| 8 | do | $Na_2S$ | 0.05 | 150 | 2 | 41.7 | 35.4 |
| 9 | Sitka Spruce | $Na_2S$ | 0.05 | 97 | 2 | 43.8 | 37.5 |
| 10 | Redwood | $Na_2S$ | 0.05 | 97 | 2 | 15.4 | 9.7 |

[1] Longleaf pine.
B.D.=bone dry.
NOTE.—Gross yield refers to total yield of extract solids. Net yield is obtained by subtracting the weight of chemical from the total extract solids and expressing the difference as percent of the original bark.

TABLE II

*Effect of extraction variables on yield as demonstrated by extraction of western hemlock bark*

| Ext. No. | Variable | Chemical | $Na_2O$: Bark Ratio | Temp., °C. | Time at Temp., Hr. | Yield, percent of B. D. bark | |
|---|---|---|---|---|---|---|---|
| | | | | | | Gross | Net |
| 1 | Time | $Na_2S$ | 0.05 | 150 | .25 | 37.7 | 31.4 |
| 2 | do | $Na_2S$ | 0.05 | 150 | 1.0 | 41.6 | 35.3 |
| 3 | do | $Na_2S$ | 0.05 | 150 | 2.0 | 46.6 | 40.4 |
| 4 | Temperature and Time | $Na_2S$ | 0.05 | 97 | 2.0 | 34.8 | 28.6 |
| 5 | do | $Na_2S$ | 0.05 | 125 | 0.87 | 36.8 | 30.5 |
| 6 | do | $Na_2S$ | 0.05 | 150 | 0.25 | 37.7 | 31.4 |
| 7 | do | $Na_2S$ | 0.05 | 175 | 0.5 | 45.5 | 39.2 |
| 8 | Chemical Usage | $Na_2S$ | 0.03 | 135 | 0.37 | 27.5 | 23.7 |
| 9 | do | $Na_2S$ | 0.05 | 150 | 0.25 | 37.7 | 31.4 |
| 10 | do | $Na_2S$ | 0.08 | 150 | 0.28 | 50.2 | 40.2 |
| 11 | do | $Na_2S$ | 0.05 | 150 | 2 | 49.1 | 42.8 |
| 12 | do | $Na_2S$ | 0.15 | 135 | 2 | 76.2 | 57.3 |
| 13 | do | $Na_2S$ | 0.20 | 150 | 2 | 100.3 | 75.1 |

TABLE III

*Extraction of bark with mixtures of $Na_2S$ and NaOH*

| Ext. No. | Bark | Mol. NaOH / Mol. $Na_2S$ | $Na_2O$: Bark Ratio | Temp., °C. | Time at Temp., Hr. | Yield, percent of B. D. bark | |
|---|---|---|---|---|---|---|---|
| | | | | | | Gross | Net |
| 1 | Western Hemlock | 1 | 0.05 | 125 | .85 | 35.3 | 28.9 |
| 2 | do | 4 | 0.05 | 125 | .83 | 36.4 | 30.0 |
| 3 | do | 9 | 0.05 | 125 | .80 | 37.1 | 30.7 |
| 4 | do | 3 | 0.05 | 150 | 2 | 46.7 | 40.4 |
| 5 | do | 3 | 0.16 | 150 | 2 | 85.8 | 65.3 |
| 6 | do | 3 | 0.07 | 150 | .35 | 47.7 | 38.7 |
| 7 | do | 3 | 0.09 | 150 | .32 | 54.0 | 42.5 |
| 8 | Southern Pine | 3 | 0.05 | 150 | .05 | 39.8 | 33.4 |
| 9 | do | 3 | 0.05 | 150 | 2.0 | 42.7 | 36.3 |

Table IV lists sulfur and phenolic hydroxyl contents of typical extracts prepared from hemlock bark using solution of sodium sulfide. If part of the equivalent $Na_2O$ is added as NaOH rather than all as $Na_2S$, the sulfide values will be reduced below the content given by the various $Na_2O$ values in Table IV.

Organically-combined sulfur is determined as the difference between total sulfur and sulfur present as the sulfide ion. Total sulfur is determined by nitric acid-perchloric acid oxidization of all sulfur to the sulfate form, precipitation of the sulfate with barium nitrate and weighing the barium sulfate precipitate. Sulfide sulfur is determined by slurrying the sample with zinc carbonate, whereby the sulfide ion is precipitated as zinc sulfide, the precipitate being separated and total sulfur determined upon it by the above-described method. (Inasmuch as addition of HCl to sulfide bark extracts liberates little, if any, $H_2S$, it appears possible that the sulfide sulfur method may not be entirely accurate, i.e., it may determine some organically-combined sulfur as well as unconsumed $Na_2S$. Thus nearly all the sulfur may be organically-combined.)

In making the determinations for the percentage of phenolic hydroxyl shown in the following tables, a modification of the method of Drs. Maranville and Goldschmid was used. This method is described in Analytical Chemistry 26, 1423–27, September 1954, in an article entitled "Ultraviolet Absorption Spectra as a Measure of Phenolic Hydroxyl Group Content in Polyphenolic Tannin-like Materials." In this modification, the solvent for the acid reference solution is acidified 1:1 ethanol instead of acidified pH 10 buffer solution.

determined. The zero gel strength ("0 Gel Strength") is the resistance of freshly stirred mud to the initiation of flow. This is also measured with the Stormer or Fann Viscometer. The "10 Minute Gel Strength" is the resistance to initiation of flow of a mud that has been allowed to stand 10 minutes. Thus the 0 and 10-minute gel strengths indicate the gel forming characteristics of the mud and give a measure of gel rate as well as gel strength. Filtration loss is a test in which a mud cake is formed by filtration and pressed against a filter permeable to water. Briefly, it comprises measuring the total volume of filtrate water obtained during a given time of pressure filtration which may conventionally be thirty minutes. This test serves to measure the ability of a drilling mud to form a thin filter cake on the bore hole wall to seal it off and thereby prevent loss of water to the formation being drilled. The properties given for drilling muds in the tables hereof were obtained using the above described tests.

The following examples demonstrate the effectiveness of the alkali bark derivatives in drilling muds over a wide range of extraction conditions, using both straight sulfide solutions and mixtures of $Na_2S$ and NaOH.

1020 gm. of native Texas clay, 340 gm. of Wyoming bentonite and 7200 gm. of water were mixed at slow speed for two hours. The mixture was aged overnight and mixed again for 0.5 hour at slow speed. Individual samples of 350 ml. were withdrawn and converted to typical fresh water drilling muds by mixing in with slow speed mixing, the following:

(1) Sufficient NaOH to give, after mixing pH values respectively of 8.5 and 12.

TABLE IV

*Organically-combined sulfur and phenolic hydroxyl content of $Na_2S$ and $Na_2S$—NaOH extracts*

| Ext. No. | Bark Species | $Na_2O$-Bark | | Max. Temp., °C. | Total Time, min. | Yield, Percent of B.D. bark | | Chemical Analyses * | | | |
|---|---|---|---|---|---|---|---|---|---|---|---|
| | | $Na_2S$ | NaOH | | | Gross | Net | Total Sulfur, Percent | Unreacted Sulfide (as S), Percent | Organically Combined Sulfur, Percent | Phenolic Hydroxyl, Percent |
| 1 | W. Hemlock | 0.03 | 0.00 | 97 | 120 | 23.6 | 19.8 | 2.4 | 1.7 | 0.7 | 10.0 |
| 2 | do | 0.08 | 0.00 | 97 | 30 | 36.5 | 26.4 | 5.7 | 2.2 | 3.5 | 11.2 |
| 3 | do | 0.15 | 0.00 | 97 | 60 | 61.5 | 42.6 | 9.2 | 4.5 | 4.7 | 9.8 |
| 4 | do | 0.03 | 0.00 | 135 | 30 | 27.5 | 23.7 | 1.9 | 1.3 | 0.6 | 10.4 |
| 5 | do | 0.08 | 0.00 | 135 | 60 | 45.0 | 34.9 | 3.2 | 1.6 | 1.6 | 6.8 |
| 6 | do | 0.15 | 0.00 | 135 | 120 | 76.2 | 57.3 | 6.2 | 2.1 | 4.1 | 6.3 |
| 7 | do | 0.03 | 0.00 | 175 | 60 | 35.1 | 31.3 | 1.5 | 1.0 | 0.4 | 5.0 |
| 8 | do | 0.08 | 0.00 | 175 | 120 | 59.0 | 48.9 | 2.6 | 1.6 | 1.0 | 4.4 |
| 9 | do | 0.15 | 0.00 | 175 | 30 | 59.9 | 41.0 | | 1.6 | | 8.1 |
| 10 | do | 0.08 | 0.00 | 150 | 30 | 50.2 | 40.2 | 3.3 | | | 14.0 |
| 11 | do | 0.005 | 0.045 | 125 | 60 | 37.1 | 30.7 | | | | 5.9 |
| 12 | do | 0.0125 | 0.0375 | 150 | 146 | 46.7 | 40.4 | | | | 4.1 |
| 13 | S. Pine | 0.0125 | 0.0375 | 150 | 139 | 42.7 | 36.3 | | | | |

* Expressed on a dry basis.

The sulfide-bark derivatives, prepared with either solutions of straight sulfide or with mixtures of alkali sulfide and alkali hydroxide, are very effective deflocculants, particularly for drilling muds.

Physical properties of drilling muds may be tested in the laboratory by procedures developed by the American Petroleum Institute, as described in "Recommended Practice for Standard Field Procedure for Testing Drilling Fluids" (API, RR 29, 3rd Ed. May, 1950). Important properties which are determined in the laboratory include viscosity, 0 and 10 minute gel strengths and filtration loss (often also termed "water loss," "filter loss," or simply "filtration"). The viscosity may be determined using either a Stormer or Fann Viscometer under standardized conditions. The values given herein were so (2) 2 gm. (equivalent to 2 lb./bbl.) of sulfided bark extract.

The samples were then stirred for five minutes with a Hamilton Beach mixer and tested by standard API methods.

The results of the tests, showing the effectiveness of the sulfided bark derivatives in comparison with untreated controls at similar pH, are given in Tables V, VI and VII.

Table V shows the effectiveness of $Na_2S$ derivatives prepared over a wide range of conditions. Table VI shows the effectiveness of derivatives prepared using $Na_2S$—NaOH mixtures. Table VII shows the effectiveness of sulfided bark derivatives using bark from conifers other than hemlock and with hemlock bark when using $K_2S$ rather than $Na_2S$.

TABLE V
Drilling mud tests on sulfide extracts of western hemlock bark

| Ext. No. | Extraction Conditions Used in Preparing Additive | | | | Drilling Mud Tests | | | | | |
|---|---|---|---|---|---|---|---|---|---|---|
| | Chem. Used | Ratio, Na₂O:Bark | Temp., °C | Time at Max. Temp., Hr. | Conc. of Additive, lb/bbl | pH | Viscosity, cp. | Gel Strength 0 | Gel Strength 10 min. | Filtration, ml./30 min. |
| Control—no additive | | | | | 0 | 8.5 | 23.8 | 31.5 | 52.0 | 9.5 |
| | | | | | 0 | 12.0 | | Too thick to test. | | |
| 1 | Na₂S | 0.03 | 65 | 2 | 2 | 8.5 | 12.4 | 5.2 | 15.7 | 9.5 |
| | | | | | 2 | 12.0 | 39.8 | 4.5 | 45.1 | 7.5 |
| 2 | Na₂S | 0.05 | 97 | 2 | 2 | 8.5 | 10.5 | 3.5 | 14.4 | 8.5 |
| | | | | | 2 | 12.0 | 34.2 | 2.6 | 39.3 | 8.5 |
| 3 | Na₂S | 0.05 | 150 | 2 | 2 | 8.5 | 11.7 | 7.5 | 13.7 | 10.5 |
| | | | | | 2 | 12.0 | 33.1 | 2.6 | 23.2 | 8.0 |
| 4 | Na₂S | 0.10 | 125 | 2 | 2 | 8.5 | 11.2 | 6.2 | 14.3 | 10.0 |
| | | | | | 2 | 12.0 | 31.0 | 2.1 | 31.5 | 8.5 |
| 5 | Na₂S | 0.20 | 90 | 2 | 2 | ¹8.5 | 13.0 | 9.1 | 23.7 | 10.5 |
| | | | | | 2 | 12.0 | 61.4 | 67.7 | 91.8 | 10.0 |
| 6 | Na₂S | 0.20 | 150 | 2 | 2 | 8.5 | 10.8 | 6.2 | 15.3 | 11.0 |
| | | | | | 2 | 12.0 | 29.2 | 11.1 | 37.6 | 10.0 |

¹ Adjusted to pH with acid.

TABLE VI
Drilling mud tests on sulfide-caustic soda extracts of western hemlock bark

| Ext. No. | Extraction Conditions Used in Preparing Additives | | | | | Drilling Mud Tests | | | | | |
|---|---|---|---|---|---|---|---|---|---|---|---|
| | Chem. | Ratio, Na₂O:Bark | Percent Na₂S* | Temp., °C | Time at Max. Temp., Hr. | Conc. of Add. lb./bbl. | pH | Viscosity, cp. | Gel Strength 0 | Gel Strength 10 min. | Filtration, ml./30 min. |
| Control—no Additive | | | | | | 0 | 8.5 | 23.8 | 31.5 | 52.0 | 9.5 |
| | | | | | | 0 | 12.0 | | Too thick to test. | | |
| 1 | Na₂S / NaOH | 0.05 | 5 | 97 | 2 | 2 | 8.5 | 11.3 | 3.8 | 19.9 | 8.5 |
| | | | | | | 2 | 12.0 | 46.3 | 8.6 | 56.5 | 8.5 |
| 2 | Na₂S / NaOH | 0.05 | 25 | 97 | 2 | 2 | 8.5 | 11.7 | 4.0 | 14.4 | 9.5 |
| | | | | | | 2 | 12.0 | 39.2 | 4.9 | 34.4 | 8.0 |
| 3 | Na₂S / NaOH | 0.05 | 25 | 150 | 2 | 2 | 8.5 | 11.8 | 7.7 | 15.2 | 9.0 |
| | | | | | | 2 | 12.0 | 38.3 | 4.1 | 34.3 | 8.0 |
| 4 | Na₂S / NaOH | 0.16 | 25 | 150 | 2 | 2 | 8.5 | 10.5 | 5.8 | 15.6 | 10.0 |
| | | | | | | 2 | 12.0 | 28.2 | 4.9 | 34.2 | 9.0 |

*As Na₂O.

TABLE VII
Drilling mud tests using various bark species with sodium or potassium sulfide ¹

| Ext. No. | Extraction Conditions Used in Preparing Additives | | | | | Drilling Mud Tests | | | | |
|---|---|---|---|---|---|---|---|---|---|---|
| | Bark Species | Chem. | Na₂O:Bark | Time at Max. Temp., Hr. | Temp., °C | pH | Viscosity, cp. | Gel Strength 0 | Gel Strength 10 min. | Filtration, ml./30 min. |
| Control—no Additive | | | | | | 8.5 | 23.8 | 31.5 | 52.0 | 9.5 |
| | | | | | | 12.0 | | Too thick to test. | | |
| 1 | Douglas Fir | Na₂S | 0.05 | 2 | 150 | 8.5 | 18.5 | 9.0 | 33.6 | 7.0 |
| | | | | | | 12.0 | 36.8 | 8.0 | 93.8 | 9.5 |
| 2 | Southern Pine | Na₂S | 0.05 | 2 | 150 | 8.5 | 18.3 | 8.4 | 39.8 | 8.0 |
| | | | | | | 12.0 | 38.0 | 7.9 | 95.6 | 9.5 |
| 3 | Western Hemlock | K₂S | 0.05 | 1 | 150 | 8.5 | 17.3 | 10.6 | 41.4 | 7.0 |
| | | | | | | 12.0 | 35.0 | 2.0 | 49.7 | 7.5 |

¹ 2 lb./bbl. additive.

The stability of aqueous solutions of phenolic adhesives is important both as regards "shelf life" on storage and "pot life" on the gluing machine. The improved stability imparted to phenolic resins by using an alkali bark derivative in comparison with a bark derivative extracted with an aqueous solution of sodium hydroxide is shown by the following experiment:

Western hemlock bark was digested with sodium sulfide equivalent to a Na₂O to bark ratio of 0.05 for two hours at a temperature of 150° C., using the general procedure given just prior to Table I.

A phenol-formaldehyde resin of 40% total solids, in which the sulfur-containing bark derivative was present as a component or extender in the amount of 49% of the total solids, had a gelling time of 39 minutes in an accelerated aging test carried out at 95–100° C. A similar resin in which the same amount of sodium hydroxide derivative of western hemlock bark had been incorporated in place of the sulfur-containing bark derivative, had a life of only 25 minutes before gelling in the above aging test. Moreover, when the adhesives were allowed to stand one week at room temperature, the composition containing the sulfur-containing bark derivative remained fluid while that containing the sodium hydroxide derivative had become too thick for satisfactory spreading.

We claim:

1. A water-soluble alkali metal thio-derivative of bark obtained by digesting a bark of the group consisting of Western hemlock, Douglas fir, Western white fir, Sitka spruce, Eastern hemlock, Southern yellow pine and redwood in a water solution of an alkali metal sulfide of the group consisting of sodium sulfide and potassium sulfide, said sulfide being equivalent to from 0.03 to 0.20 part $Na_2O$ per part of dry bark, the reaction mixture containing from 3% to 25% of bark based on the bone dry weight of the bark, at a temperature of from 65° C. to 175° C., and separating the water-soluble thio-derivative from a bark residue.

2. The water-soluble alkali metal thio-derivative of bark resulting from the digestion of claim 1 in which the solution contains an alkali metal sulfide equavilent to from 0.03 to 0.10 part of $Na_2O$ per part of dry bark.

3. The water-soluble alkali metal thio-derivative of bark resulting from the digestion of claim 1 in which the solution contains an added hydroxide of one of said alkali metals, and the content of alkali metal sulfide is at least 5% of the total $Na_2O$.

4. The water-soluble alkali metal thio-derivative of bark resulting from the digestion of a bark of the group consisting of Western hemlock, Douglas fir, Western white fir, Sitka spruce, Easten hemlock, Southern yellow pine and redwood in which the bark is digested in an aqueous solution containing an alkali metal sulfide of the group consisting of sodium sulfide and potassium sulfide, said alkali metal sulfide being equivalent to from 0.03 to 0.20 part $Na_2O$ per part of dry bark, at a temperature of from 65° C. to 175° C., the reaction mixture containing from 3 to 25% of bark based on the bone dry weight of the bark, the digestion being continued until a substantial amount of the sulfide is combined as a water-soluble alkali metal thio-derivative of the bark.

5. The water-soluble alkali metal thio-derivative of bark resulting from the digestion of claim 4 in which the aqueous solution contains also an hydroxide of one of said metals and the alkali metal sulfide comprises at least 5% of the total $Na_2O$.

6. The water-soluble alkali metal thio-derivative of bark resulting from the digestion of claim 4 in which the mixture contains from 10 to 20% of bark based on the bone dry weight of the bark.

7. The water-soluble alkali metal thio-derivative of bark resulting from the digestion of claim 4 in which the alkali metal sulfide is equivalent to not more than 0.10 part $Na_2O$ per part of dry bark.

References Cited in the file of this patent

UNITED STATES PATENTS 2,674,594     Lewis et al.     Apr. 6, 1954

OTHER REFERENCES

Hagglund: Chemistry of Wood, page 17 (1951 edition) Academic Press Inc., New York, N.Y.

Wise-Jahn: Wood Chemistry (2nd edition 1952) pp. 439, 893, 1022.